United States Patent [19]

Smith

[11] Patent Number: 5,057,356
[45] Date of Patent: Oct. 15, 1991

[54] TEMPORARY FLOOR SURFACE FOR MOVING HEAVY ITEMS

[76] Inventor: Terry C. Smith, 16435 SE. 34th St., Bellevue, Wash. 98008

[21] Appl. No.: 537,254

[22] Filed: Jun. 13, 1990

[51] Int. Cl.$^5$ .............................................. B32B 9/00
[52] U.S. Cl. ................................. 428/192; 428/542.2; 428/908.8; 16/42 R
[58] Field of Search ..................... 16/42 R; 428/542.2, 428/76, 908.8, 192

[56] References Cited

U.S. PATENT DOCUMENTS

| | | | |
|---|---|---|---|
| 3,883,923 | 5/1975 | England | 16/42 |
| 4,468,910 | 9/1984 | Morrison | 52/591 |
| 4,654,245 | 3/1987 | Bulzer et al. | 428/192 |

Primary Examiner—Patrick J. Ryan
Assistant Examiner—Cathy Lee
Attorney, Agent, or Firm—David L. Tingey

[57] ABSTRACT

A removable floor surface is provided with slick, thin strips of nylon for use in moving a heavy household appliance without lifting of the heavy appliance and without damage to a common floor covering such as vinyl or wood, comprising four such strips in two matching pairs: a first pair of temporary strips to facilitate displacement of the appliance away from its normal location and a second pair of removable stationary strips for continued support of an appliance in its usual location. On each temporary strip is provided a removable ramp on a first end to facilitate initial raising of the appliance onto the first pair of strips without lifting.

7 Claims, 1 Drawing Sheet

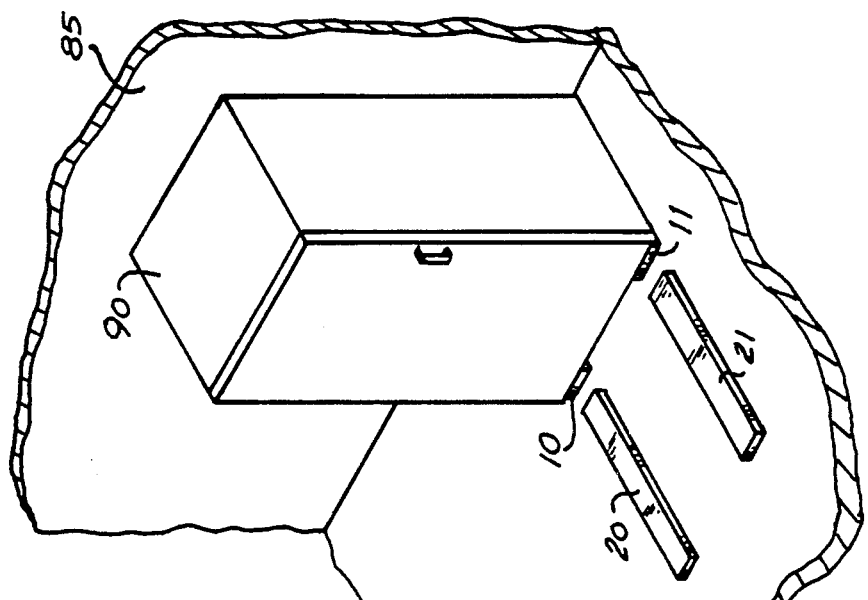
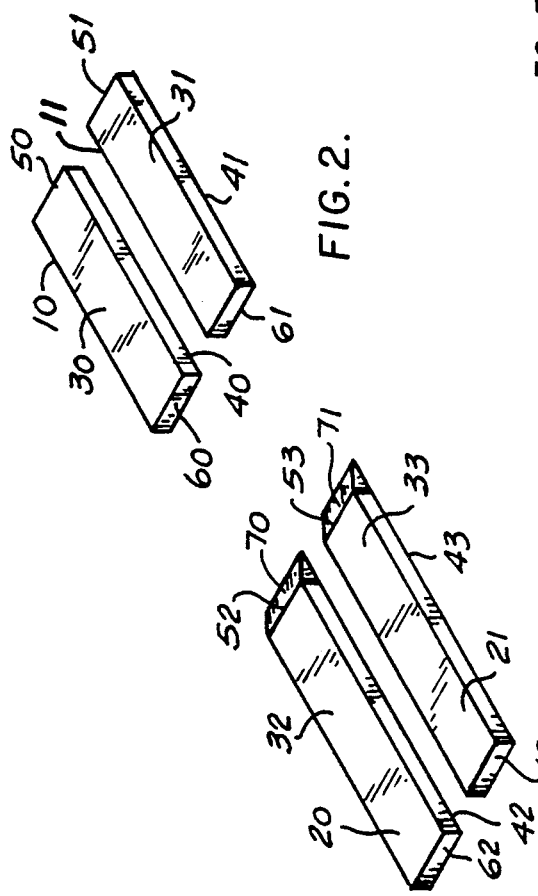
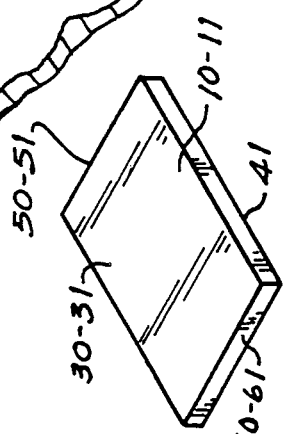
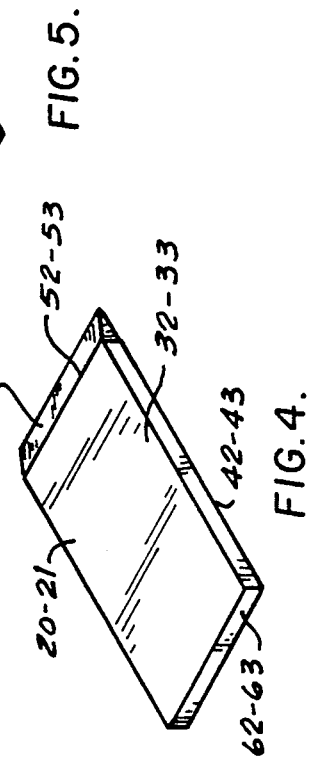
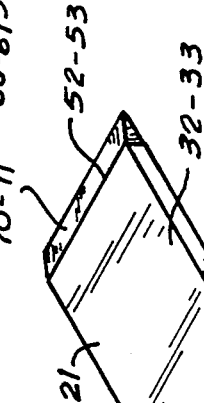

TEMPORARY FLOOR SURFACE FOR MOVING HEAVY ITEMS

BACKGROUND OF THE INVENTION

The present invention relates to removable surfaces used as floor protectors and facilitators in the moving of heavy household appliances.

A removable floor surface placed over soft floor coverings such as vinyl or wood is useful to prevent damage to such soft floor coverings when a heavy item is moved from its normal placement such as during replacement of or cleaning under or repairing the heavy item. For example, a large household appliance such as a freezer, refrigerator, washer or dryer normally placed in close juxtaposition with a wall when moved away from the wall threatens gouging, tearing or denting damage to a vinyl or wood floor covering of a kitchen or washroom area. Movement of a heavy appliance is also difficult, usually requiring exertion of a force beyond that of many persons. In the interest of protecting the floor from damage, one might consider lifting the appliance onto a temporary surface. Such lifting is at least strenuous and difficult and also threatens back damage to the person attempting to do so. Appliance installers with frequent lifts are particularly susceptible to bodily injury.

It is known in the art to have floor covering protectors for appliances. For example, Davis, U.S. Pat. No. 4,156,048, teaches a floor covering of lubricated panel strips of hard stiff material and adhesive means for disposition beneath a heavy appliance in its usual placement and requiring lifting of the front legs of the appliance.

BRIEF DESCRIPTION OF THE INVENTION

It is the primary object of the present invention to provide a temporary surface as a floor protector to cover a soft floor surface such as kitchen vinyl or wood that is exposed to damage during movement of a major household appliance.

Another object is that the floor protector surface provide for appliance movement completely out of its usual location, for example, to facilitate cleaning under or replacing the appliance.

A further object is that such floor protector surface be inherently slick to facilitate appliance movement without excessive exertion and without the use of a lubricant.

Still another object is that the floor protector surface be easy to install without lifting the appliance.

Still another object is that the floor protector surface be constructed of mildly soft, pliable material that itself will not damage the floor covering during use or if accidentally dropped, yet is strong enough to support the heavy appliance without permanent deformation.

A final object is that the floor protector surface provide for its own convenient removal, for example, for cleaning purposes around and under the floor protector assembly.

In providing means for moving a heavy appliance without lifting it or without damage to a floor covering, the invention may comprise a first temporary panel which supports a heavy item in a temporary location and a second panel which supports a heavy item in a usual location, although the preferred embodiment comprises slick, plastic, narrow, thin strips. Four such strips are typically provided in two matching pairs: a first pair of temporary strips to facilitate temporary displacement of the appliance away from its normal location, for example, for cleaning purposes, and a second pair of removable stationary strips for continued support of an appliance in its usual location. On each temporary strip is provided a removable ramp on a first end to facilitate initial raising of the appliance onto the first pair of strips without lifting.

Advantage and novelty of these strips is seen when, with the temporary strips in front-to-back alignment with legs on sides of the appliance and the ramp of each temporary strip placed close to the front legs of the appliance, only a minimal forward thrust motion is required to slide the appliance up and onto the temporary strips. With the first pair of temporary strips supporting the appliance, the ramps of the first pair of strips are easily removed leaving an abrupt end similar to the other ends of the strips.

Each of the stationary strips comprises a second end matching, without gap, an abutted first end of a temporary strip with ramp removed having a width sufficient for ease in moving the appliance without undue alignment, a length to match the distance between front and back legs of the appliance, and thickness sufficient to support the weight of a normal major appliance such as a loaded refrigerator or freezer without permanent deformation of a strip.

Advantage is seen for these strips in a typical application. For example, while temporary strips are supporting legs of an appliance in temporary disposition (away from a wall), the stationary strips, cut to fit, are placed in front-to-back alignment with legs of the appliance with ends abutting the ends of the temporary strips, ramp removed, providing an effective extension of the temporary strips. A minimum rearward thrust is then applied to the appliance which slides the appliance off the temporary strips and onto stationary strips, the appliance returning to its normal location with the second pair of strips continuing to support the appliance until it is again removed by once again abutting ends of temporary strips to ends of stationary strips and applying a minimum thrust to slide the appliance out of position. The stationary strips, installed without adhesive means, remaining removable for cleaning purposes by extending to a wall which prevents rearward slippage of the strips.

BRIEF DESCRIPTION OF THE DRAWINGS

FIG. 1 is a perspective view of the two temporary strips with removable ramps.

FIG. 2 is a perspective view of the two stationary strips.

FIG. 3 is a perspective view illustrating the application of the strips.

FIG. 4 is a perspective view of an alternative embodiment showing a single temporary panel.

FIG. 5 is a perspective view an alternative embodiment showing a single stationary panel.

DESCRIPTION OF THE PREFERRED EMBODIMENTS

Referring to the figures, in its usual configuration the present invention comprises two stationary plastic strips 10 and 11 and two temporary strips 20 and 21, with upper surfaces 30, 31, 32, and 33, respectively, lower surfaces 40, 41, 42, and 43, respectively, stationary strip first ends 50 and 51 and temporary strip first ends 52 and 53, respectively, and stationary strip second ends 60 and 61 and temporary strip second ends 62 and 63, respectively. Strips 10, 11, 20, and 21 are preferably constructed of a material that is slick without a lubricant and pliable, such as nylon, polyethylene, or polypropylene yet able to support the weight of a heavy appliance without marring a floor surface 80 during use even if the strips are accidentally dropped onto the surface. Lower surfaces 40, 41, 42, and 43 may be roughened to inhibit sliding of the strip on a floor surface or covering. Temporary strips 20 and 21 are essentially the same as stationary strips 10 and 11 except that the stationary strips 10 and 11 may differ in length from temporary strips 20 and 21, and except that temporary strips 20 and 21 further comprise ramps 70 and 71 to facilitate initial installation of the invention. Ramps 70 and 71, with a ramp surface extending from the undersurface to the upper surface on each temporary strip first end, are removably attached to strips 20 and 21, respectively, on temporary strip first ends, 52 and 53. When ramps 70 and 71 are removed, remaining temporary strip first ends 52 and 53 match in abutment to stationary strip second ends 60 and 61.

When appliance 90 with front legs 91 and rear legs 93 initially is to be moved away from its normal location, temporary strips 20 and 21 are placed on exposed floor surface 80 in front-to-back alignment with appliance side legs 91 and 93 and side legs 92 and 94, respectively, with ramps 70 and 71 placed next to appliance front legs 91 and 92. A minimal forward thrust on the appliance causes the appliance legs to rise up the ramps onto strips 20 and 21. Ramps 70 and 71 are then removed. Length of strips 10 and 11 are then appropriately cut to fit; for example, the length may be cut to match the distance from a back wall 85 to ends 52 and 53 Of strips 20 and 21. Ends 60 and 61 of stationary strips 10 and 11 are then placed in abutment against ends 52 and 5 of temporary strips 20 and 21. A rearward thrust is then applied to the appliance, and the appliance is moved easily from the temporary strips 20 and 21 onto the stationary strips 10 and 11 and temporary strips 20 and 21 are removed and stored. The appliance remains supported on stationary strips 10 and 11 until removal if again required at which time the first pair of temporary strips 20 and 21 are again placed in abutment with stationary strips 10 and 11, and the process is repeated, the removed ramps 70 and 71 now no longer being needed.

Having described the invention, the following claims are made:

1. A removable floor surface which facilitates movement of a heavy household appliance, such as a refrigerator, without damage to a soft floor covering such as vinyl or wood with the removable floor surface supporting the appliance both in normal and in removed positions and comprising two elongated stationary plastic strips and two elongated temporary strips each with an upper surface, an undersurface, a first end, and a second end, a severable ramp on a first end of each of the two temporary strips with a ramp surface extending from the undersurface to the upper surface of each temporary strip to facilitate initial positioning of a heavy item with legs, such as a refrigerator, onto the temporary strips, the first end becoming the same as its second end when the ramp is severed, each strip, respectively, placed in parallel, spaced-apart relation in front-to-back alignment with legs of the heavy item, each stationary strip being abutted without gap against an end of a temporary strip without a ramp thereby enabling the heavy item to be thereafter positioned on and supported by the two stationary strips with the heavy item in its normal location.

2. The removable floor surface described in claim 1 wherein its construction is of a material that is slick without a lubricant.

3. The removable floor surface described in claim 1 wherein its construction is a plastic material such that it does not mar a floor covering of vinyl or wood during use.

4. The removable floor surface described in claim 1 further comprising rough undersurfaces in the temporary strips and the stationary strips to inhibit sliding on the floor without adhesive.

5. A removable floor surface which facilitates movement of a heavy household appliance, such as a refrigerator, without damage to a soft floor covering such as vinyl or wood with the removable floor surface supporting the appliance both in normal and in removed positions and comprising a temporary support platform and a stationary support platform, each sufficiently wide in dimension to support the legs of the heavy item and each with a platform upper surface, an undersurface, a first end, and a second end, a severable ramp on a first end of the temporary platform with a ramp surface extending from the undersurface to the upper surface of the platform to facilitate initial positioning of a heavy item with legs, such as a refrigerator, onto the platform, the first end becoming the same as its second end when the ramp is severed, the temporary platform placed in front-to-back alignment with legs of the heavy item, the stationary platform being abutted without gap against an end of the temporary platform without a ramp thereby enabling the heavy item to be positioned thereafter on and supported by the stationary platform with the heavy item in its normal location.

6. The removable floor surface described in claim 5 wherein the temporary platform or the stationary platform comprises two temporary strips placed in parallel, spaced-apart relation and in front-to-back alignment with legs of the heavy item.

7. The removable floor surface described in claim 5 wherein a platform comprises a single panel.

* * * * *